US010703389B2

(12) United States Patent
Dzolovic et al.

(10) Patent No.: US 10,703,389 B2
(45) Date of Patent: Jul. 7, 2020

(54) COMPRESSION LIMITING MANWAY GASKET

(71) Applicant: Salco Products, Inc., Lemont, IL (US)

(72) Inventors: Vedran Dzolovic, Norridge, IL (US); David A. Oestermeyer, Downers Grove, IL (US); Thomas A. Kohls, Downers Grove, IL (US); William Borowski, Lemont, IL (US)

(73) Assignee: Salco Products, Inc., Lemont, IL (US)

( * ) Notice: Subject to any disclaimer, the term of this patent is extended or adjusted under 35 U.S.C. 154(b) by 253 days.

(21) Appl. No.: 15/916,733

(22) Filed: Mar. 9, 2018

(65) Prior Publication Data

US 2018/0273055 A1 Sep. 27, 2018

Related U.S. Application Data

(60) Provisional application No. 62/474,359, filed on Mar. 21, 2017.

(51) Int. Cl.
| | | |
|---|---|---|
| *B65D 90/00* | (2006.01) | |
| *F16J 15/10* | (2006.01) | |
| *F16J 13/16* | (2006.01) | |
| *F16J 15/12* | (2006.01) | |
| *F16J 13/18* | (2006.01) | |
| *B61D 15/08* | (2006.01) | |
| *B65D 90/10* | (2006.01) | |

(52) U.S. Cl.
CPC .............. *B61D 5/08* (2013.01); *B61D 15/08* (2013.01); *F16J 13/16* (2013.01); *F16J 13/18* (2013.01); *F16J 15/104* (2013.01); *F16J 15/127* (2013.01); *B65D 90/10* (2013.01); *B65D 2543/00953* (2013.01)

(58) Field of Classification Search
CPC .. F16J 13/16; F16J 13/18; F16J 15/104; F16J 15/127
See application file for complete search history.

(56) References Cited

U.S. PATENT DOCUMENTS

| | | |
|---|---|---|
| 368,189 A | 8/1887 | Carter |
| 1,980,335 A | 8/1932 | Hewitt et al. |
| 2,359,118 A | 6/1942 | Johnston |
| 2,532,891 A | 9/1943 | Chupp |

(Continued)

OTHER PUBLICATIONS

Garlock-Gylon 3545 Tuff Rail Manway Gasket, 2017, 3 pgs.
Garlock Brochure—Gylon 3545Tuff-Rail, 2017, 2 pgs.
CTG-ET Energizer Gasket, 2004, 2 pgs.

*Primary Examiner* — Jason C Smith
(74) *Attorney, Agent, or Firm* — Leydig, Voit & Mayer, Ltd.

(57) ABSTRACT

A gasket for sealing between the open end of a manway nozzle body of a containment vessel and an associated cover comprising a resilient annular ring member having a bail including a plurality of rigid arcuate inserts spaced about the bail that extends between radially inner and radially outer depending legs. The bail includes at least one annular upstanding chevron extending about an upper surface and at least one annular depending chevron extending about a lower surface. The inserts and bail have about the same thickness. A method includes compressing the gasket between the manway nozzle and cover, and the rigid inserts limit the compression of the gasket.

17 Claims, 4 Drawing Sheets

(56) References Cited

U.S. PATENT DOCUMENTS

| | | | | |
|---|---|---|---|---|
| 2,357,257 | A * | 8/1944 | Goetze | F16L 23/22 |
| | | | | 277/610 |
| 2,739,001 | A | 9/1952 | Chiles, Jr. | |
| 2,790,660 | A | 9/1953 | Jones | |
| 3,930,656 | A * | 1/1976 | Jelinek | F02F 11/00 |
| | | | | 277/611 |
| 3,957,275 | A * | 5/1976 | Belter | F16J 15/0818 |
| | | | | 277/594 |
| 5,196,523 | A | 3/1993 | Lee | |
| 5,678,827 | A * | 10/1997 | Burian | F16J 15/106 |
| | | | | 105/377.07 |
| 5,944,322 | A * | 8/1999 | Coff | F16J 15/127 |
| | | | | 277/594 |
| 8,166,891 | B2 * | 5/2012 | Borowski | B61D 5/08 |
| | | | | 105/377.05 |
| 8,196,523 | B2 | 6/2012 | Blevins, Jr. | |
| 8,397,646 | B2 * | 3/2013 | Blevins, Jr. | B29C 43/027 |
| | | | | 105/377.05 |
| 8,656,840 | B2 | 2/2014 | Borowski et al. | |
| 2002/0030326 | A1 * | 3/2002 | Bettencourt | F16J 15/065 |
| | | | | 277/602 |
| 2004/0135322 | A1 * | 7/2004 | Weisbrodt | F16J 15/104 |
| | | | | 277/608 |
| 2009/0302551 | A1 * | 12/2009 | Salameh | F16J 15/0818 |
| | | | | 277/592 |
| 2014/0255162 | A1 * | 9/2014 | DiBenedetto | F02C 7/36 |
| | | | | 415/122.1 |
| 2015/0211671 | A1 * | 7/2015 | Oliver | F16L 55/1157 |
| | | | | 138/89 |
| 2015/0252903 | A1 * | 9/2015 | Boyd | F16J 15/061 |
| | | | | 244/119 |
| 2015/0329284 | A1 * | 11/2015 | Benet | B65D 53/02 |
| | | | | 220/378 |
| 2016/0223119 | A1 * | 8/2016 | Oliver | F16L 55/1157 |
| 2018/0273055 | A1 * | 9/2018 | Dzolovic | B61D 5/08 |

* cited by examiner

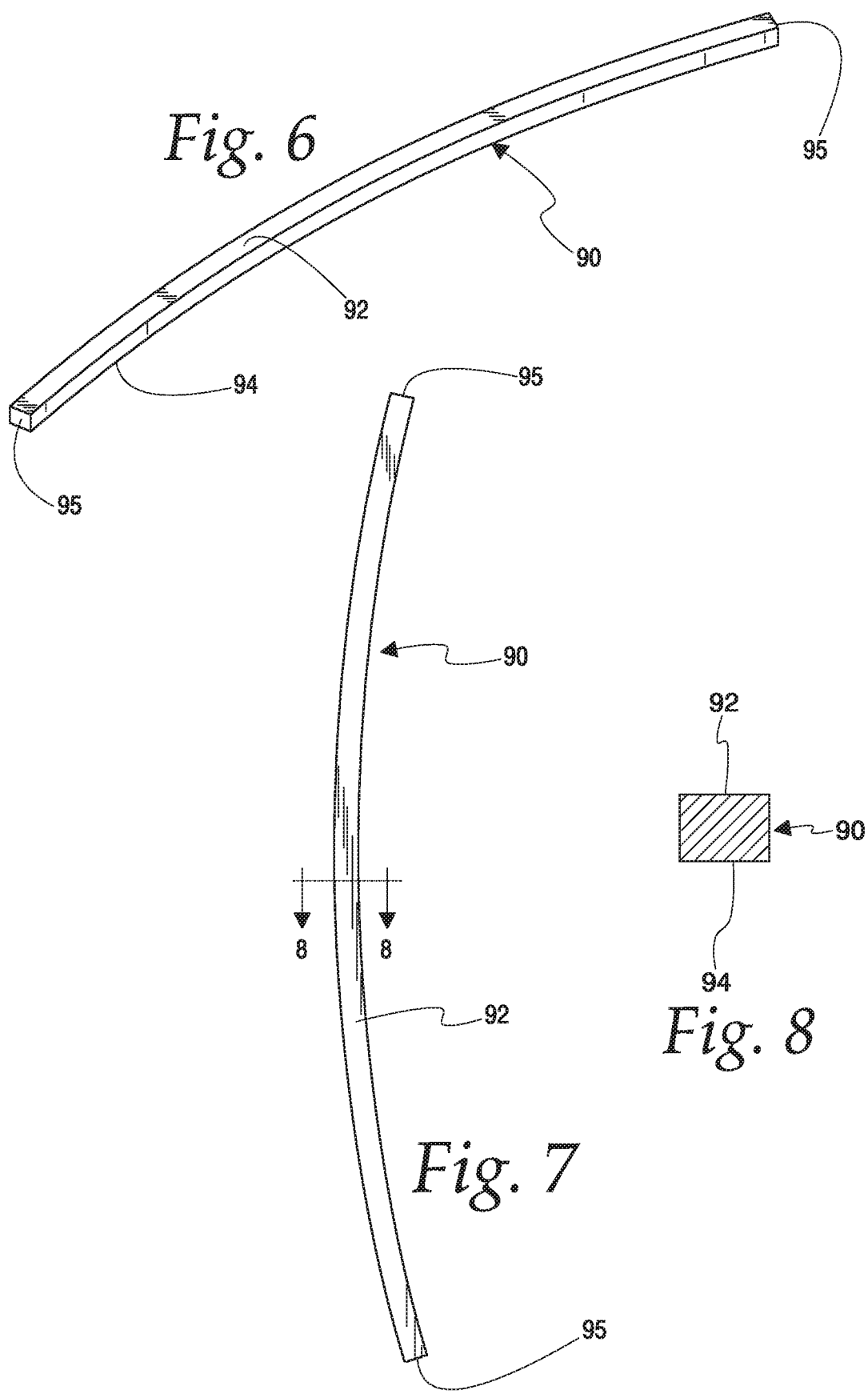

COMPRESSION LIMITING MANWAY GASKET

CROSS-REFERENCE TO RELATED APPLICATIONS

This application claims priority pursuant to Title 35 USC § 119(e) to the U.S. Provisional Patent Application Ser. No. 62/474,359, filed Mar. 21, 2017, entitled "Compression Limiting Manway Gasket," the entire contents of which are hereby incorporated by reference herein as if fully set forth.

BACKGROUND AND SUMMARY OF DISCLOSURE

This disclosure relates to a gasket for sealing a cover upon a railroad tank car manway nozzle. More particularly, it relates to a railroad tank car manway gasket having compression limiting inserts carried by a resilient gasket body.

Highly successful railroad tank car manway gaskets are known from U.S. Pat. Nos. 5,678,827 and 8,166,891, owned by Salco Products, Inc., Lemont, Ill., the assignee and applicant here. The entire content of the disclosure of these patents, including specification, drawings and claims, are hereby incorporated by reference herein as if fully set forth.

The railroad industry continually seeks improvements in the effectiveness and longevity of gaskets employed in sealing the cover-to-manway nozzle joint, particularly, with the increased transportation by rail of crude oil and its derivatives, as well as caustic or otherwise hazardous chemicals.

One such effort has involved employing a rigid ring of metal as a carrier for a resilient multi-component seal element. Such an arrangement is illustrated in U.S. Pat. Nos. 8,196,523 and 8,397,646. The feature introduced by these gaskets is the presence of an annular compression limiting carrier that prevents excessive deformation or compression of the elastomeric sealing members. These efforts, however, have presented a cumbersome product that unduly raises the expense of the sealing process. Accordingly, these gaskets have not found wide acceptance in the marketplace.

The present disclosure provides a solution that maintains the overall monolithic resilient gasket body and also incorporates compression limiting capability to avoid excessive deformation or physical damage during attachment of a manway cover to its manway nozzle. This limitation of compression or deformation is provided by a series of rigid arcuate inserts spaced about the annular gasket body at intervals aligned with the tightening or closure bolts that releasably attach a manway cover to its nozzle ring. The longitudinal thickness of the inserts is established in relation to the longitudinal extent of the sealing element to permit sufficient resilient gasket deformation without application of excessive or destructive compressive forces upon the resilient gasket body.

DESCRIPTION OF THE DRAWINGS

Referring to the drawings:

FIG. 6 is a perspective view of one of the compression limiting inserts carried by the resilient manway gasket of the present disclosure.

FIG. 7 is a plan view of the compression limiting insert of FIG. 6.

FIG. 8 is a cross-sectional view of the compression limiting insert of FIG. 7 taken along the line 8-8 of FIG. 7.

DETAILED DESCRIPTION OF ILLUSTRATED EMBODIMENT

Figure 1:
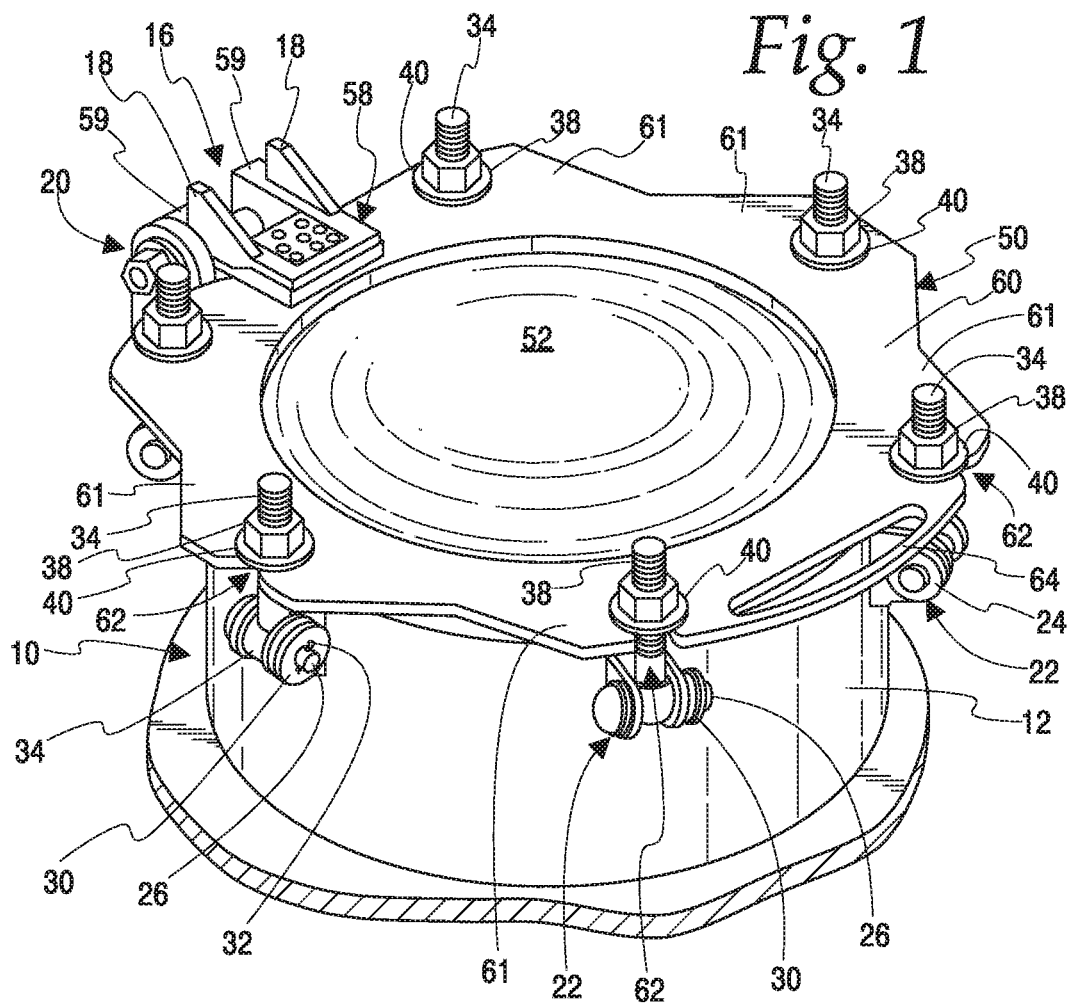
FIG. 1 is a perspective view of a manway nozzle and cover of a railroad tank car between which is installed a gasket in accordance with this disclosure to provide a seal between the cover and nozzle ring.

Referring now to the drawings, FIG. 1 illustrates a typical railroad tank car manway nozzle and cover arrangement. The manway nozzle comprises a cylindrical tubular body or ring 12 welded to the top of a railroad car surrounding an access opening. The cylindrical opening of the tubular body 12 provides access to the interior of the tank car to perform functions such as loading, unloading, cleaning and inspection.

The open end of the tubular manway nozzle body 12 is closed by a removable cover 50. The cover 50 is arranged to close the opening and secure the interior of the car. It can be opened to permit interior access when needed.

A resilient annular sealing gasket 70 is interposed between the cover 50 and manway nozzle body 12 to provide a fluid tight seal. The configuration of gasket 70 is discussed in detail below and is seen in FIGS. 3 to 9.

Figure 2:
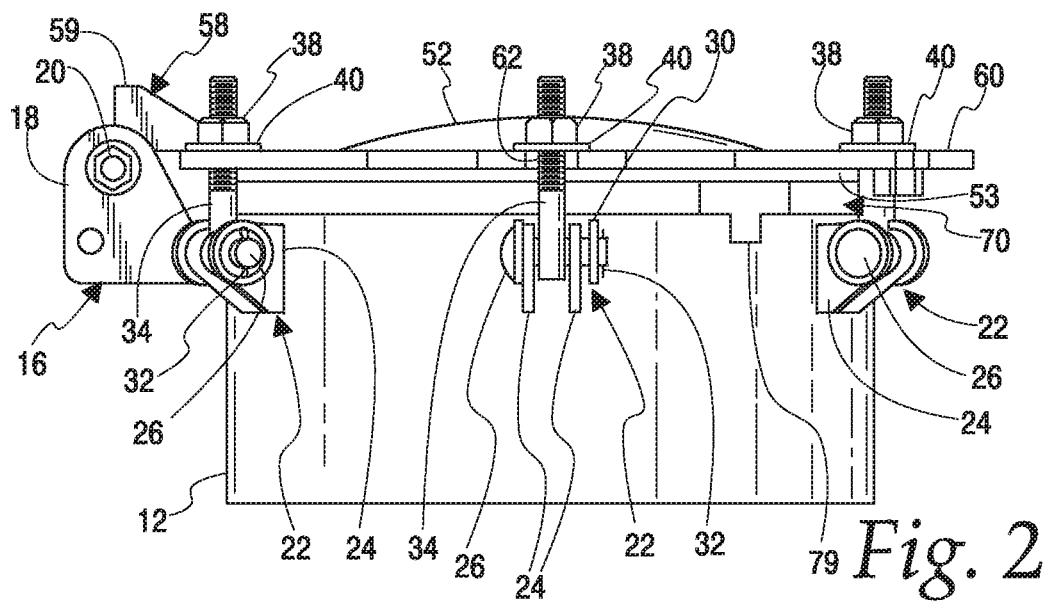
FIG. 2 is a side elevational view of the manway nozzle and cover illustrated in FIG. 1.

Referring to FIGS. 1 and 2, vertical tubular body or ring 12 of manway nozzle typically has a twenty inch (20") internal diameter. It is made of steel with a five-eighth inch (⅝") wall thickness between interior and exterior surfaces. The size is only exemplary. The nozzle tubular member could have a larger or smaller diameter.

Figure 3:
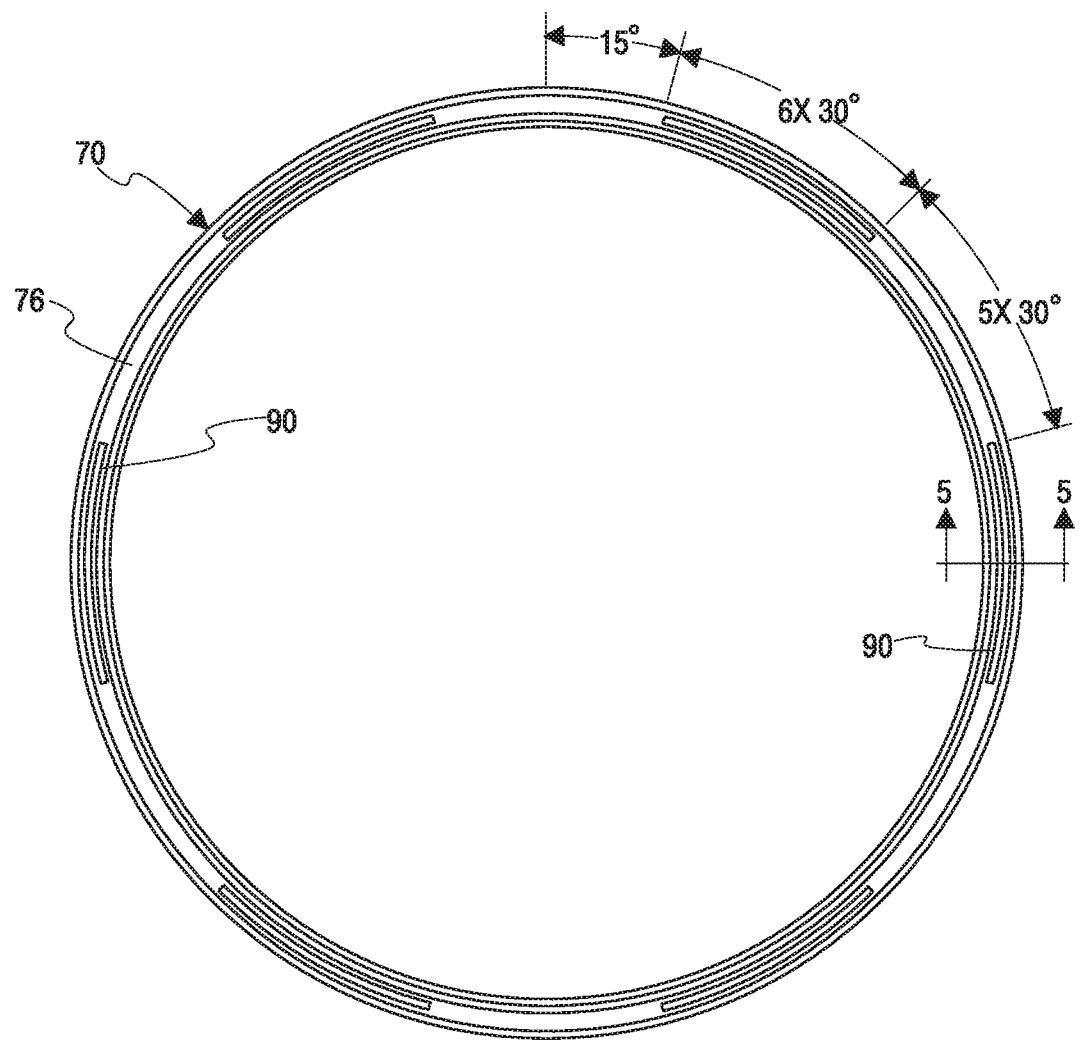
FIG. 3 is a plan view of a tank car manway gasket in accordance with this disclosure.

Seen in FIG. 3, tubular body 12 of the manway nozzle terminates at an upper terminus in an upper generally planar annular sealing surface 14 which makes sealing contact with gasket 70. As seen in FIGS. 1 and 2, a cover bracket 16 includes vertically aligned spaced arms 18 welded to the manway tubular body 12 outer wall surface. The arms support a pivot bolt 20 which pivotally supports the cover 50 on the manway tubular body 12.

A plurality of securement brackets 22 are equally spaced about the manway body 12. As illustrated, there are six (6) such brackets 22. Typically a manway body having a twenty inch (20") internal diameter is provided with six (6) equally spaced securement brackets 22. However, eight (8) could be provided, depending on the diameter of the manway body 12.

Each securement bracket 22 includes two spaced apart vertical arms 24 welded to the tubular body 12. The arms 24 include aligned apertures which support a cross, or pivot pin 26. The pins 26 are removably secured to the securement brackets 22. As illustrated, each pin 26 includes a head at one end. The opposite end receives a washer 30 and cotter pin 32 to affix the pins 26 in securement brackets 22.

Each securement bracket 22 supports a clamping eye bolt 34 that includes an eyelet end pivotally mounted on one of the cross pins 26. The free end is threaded and receives a clamping nut 38 and washer 40 which engage the upper surface of cover 50. Tightening the nuts 38 draws the cover 50 toward the manway nozzle tubular body 12 to clamp the gasket 70 between the two components. For a typical twenty inch (20") diameter cover, the bolts are five eighths inch to one inch (⅝ to 1") in diameter.

Cover 50 is a steel fabrication. Its shape generally corresponds to the shape of manway body 12. As illustrated in FIGS. 1 and 2, it includes a central dome portion 52 that is about the same diameter as the opening defined by manway nozzle ring 12. It includes generally annular outer rim portion 53 surrounding dome portion 52 to which is welded clamping plate 60.

Cover 50 includes a hinge bracket 58 welded to clamping plate 60. Hinge bracket 58 extends outward of the cover 50 away from dome portion 52. It includes vertical flanges 59 that fit between spaced arms 18 of cover bracket 16. Vertical flanges 59 each define an aperture aligned with the aligned apertures of arms 18. Cover pivot bolt 20 extends through the apertures and pivotally secures the cover 50 to manway tubular body 12. Though not shown, the apertures in flanges 59 are vertically elongate. This configuration permits an amount of vertical play or movement necessary to adequately tighten the cover 50 onto the manway tubular body 12.

Clamping plate 60 of cover 50 also includes an elongate aperture opposite the hinge bracket 56. The plate 60 thus defines a lifting handle 64 to assist in pivotal movement of the cover 50 on cover bracket 16.

Clamping plate 60 defines a series of radial outward extensions 61 that overlie the securement brackets 22. (In the illustrated embodiment, there are six (6) such extensions.) Each extension 61 defines a slot 62 sized to receive an eye bolt 34. The slots extend radially inwardly such to permit the eye bolts 34 to be positioned vertically. On tightening of the nuts 38 upon eye bolts 34, the upper surfaces on each side of slots 62 of the extensions 61 receives the clamping load of nuts 38 and washers 40.

Figure 9:
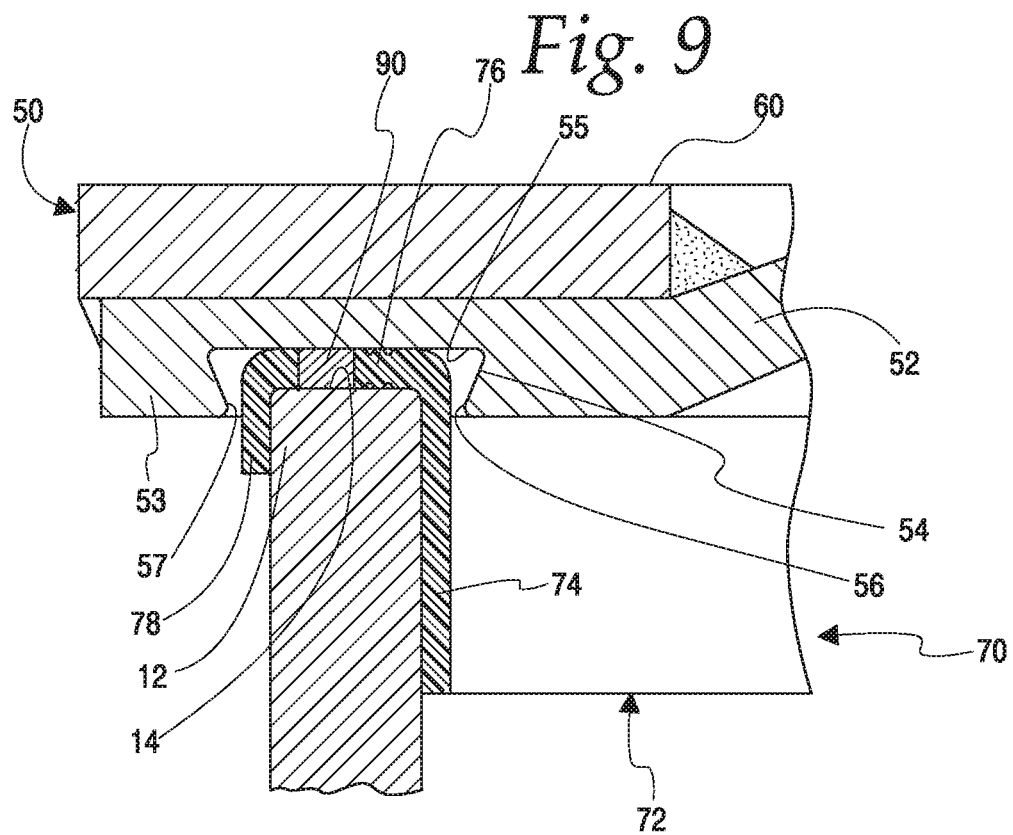
FIG. 9 is a fragmentary, sectional side view, of the assemblage of FIGS. 1 and 2 showing the manway nozzle with affixed cover and manway gasket disposed in sealing relation to the other components.

Referring to FIG. 9, the under surface of rim portion 53 of cover 50 includes an annular relief 54 within which is defined a lower generally planar annular sealing surface 55. The radially inner terminus of relief 54 includes a rounded edge 56 formed on a diameter slightly smaller than the radially inner diameter of gasket 70. The radially outer terminus of relief 54 includes a rounded edge 57 formed on a diameter slightly larger than the radially outer diameter of gasket 70. On closure of cover 50 the gasket 70 resides within annular relief 54 between inner and outer rounded edges 56 and 57.

FIGS. 3 to 5 and 9, illustrate an embodiment of the resilient annular sealing gasket 70 of the present disclosure. The gasket can be either compression molded or injection molded from a variety of commodity-sensitive materials such as butyl rubber, Viton (a DuPont trademark), EPDM or white nitrile. A Shore A durometer of about 70-75 is preferred. Best seen in FIGS. 5 and 9, the gasket is a monolithic ring member of an inverted J-shaped cross section formed by an inward long leg 74, a bail 76 and an outward short leg 78. The vertical legs are separated by a distance approximately equal to the radial thickness of a manway nozzle ring 12. Thus, as shown in FIG. 9, when the gasket is installed, the long leg 74 engages the nozzle ring inside wall, the underside of the bail 76 rests on the generally planar annular sealing surface 14 and the short leg 78 engages the nozzle ring outer wall.

Figure 5:
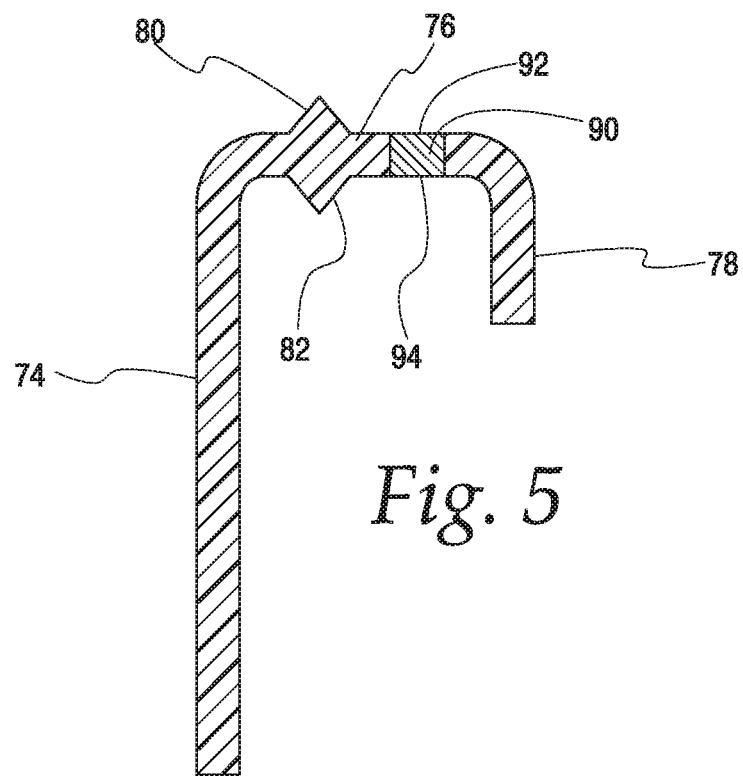
FIG. 5 is a sectional view of the manway gasket of the disclosure taken along the line 5-5 of FIG. 3.

Details of the gasket are best seen in FIG. 5. The long leg 14 is substantially longer than the short leg 78. This is to provide more part stability when the dome lid cover closes down on the ring member. The long leg also resists the tendency of the gasket to roll or peel off the nozzle. To provide this stability the long leg should be at least about four times as long as the short leg. For reference purposes only, it has been found that a long leg length of two inches (2.0") and a short leg length of about three-eighths inches (⅜") (both measured from the bottom of the bail 76) are acceptable dimensions. The legs 74 and 78 are about 0.125 inches thick. The bail 76 is about 0.100 inch thick in the longitudinal direction.

The outside corner of the junction between the long leg 74 and bail 76 has a non-square corner that is important to the effectiveness of the gasket. In effect, this corner has some material removed to avoid interference with closing covers or dome lids. It will be understood that prior cover designs anticipated incorporating a gasket in the cover and thus did not anticipate the presence of a gasket on the top of the nozzle ring 12.

Figure 4:
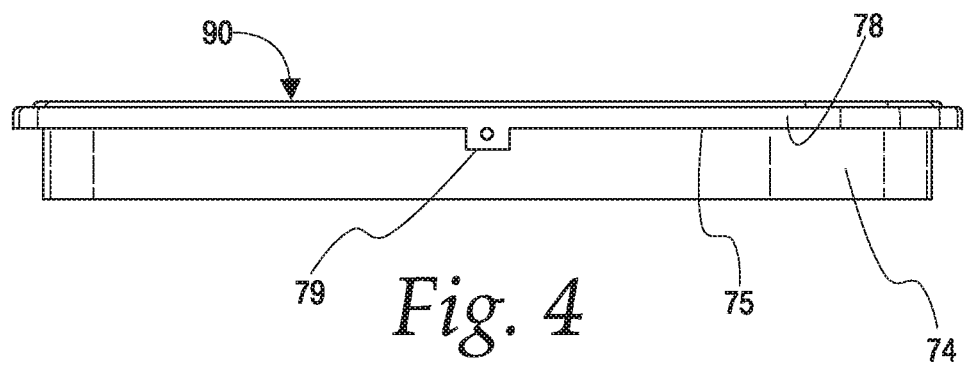
FIG. 4 is a side view of the gasket of FIG. 3.

As shown in FIGS. 2 and 4, there is at least one gasket tab 79 molded on the outward, exposed edge 75 of short leg 78 of the ring. This tab is a visual flag to indicate the presence of a gasket upon the nozzle ring when the cover is closed. Preferably, there are two such tabs, 180° (degrees) apart. In connection with this disclosure, tabs 79 also provide an alignment function as explained below.

In accordance with the principles of this disclosure, gasket 70 has two longitudinally outwardly extending annular chevrons 80 and 82 located respectively on the upper and lower surface of the bail 76. These chevrons are molded integrally from the same material as the gasket leg and bail components. The chevrons provide extra height above and below the bail 76 to allow for effective compression and deformation on closure of cover 50 on nozzle ring 12.

The horizontal bail 76 of gasket 70 includes annular upwardly directed and annular downwardly directed chevrons 80 and 82 configured to respectively engage cover planar annular sealing surface 55 and nozzle ring annular sealing surface 14 in sealing relation. The chevrons 80 and 82 are located on the bail 76 near the radially inward edge adjacent long leg 74 integral to the bail 76 of the monolithic gasket 70. In the illustrated embodiment, chevrons 80 and 82 are of generally triangular in cross-section and extend from the surfaces of bail 76 about 0.100 inches. The tip of each chevron is formed at an included acute angle of 80° (degrees). These dimensions are illustrative only and may vary.

The chevrons 80 and 82 are intended to deform upon closure of the cover 50 onto the nozzle ring 12. As can be appreciated, the chevrons are placed under compressive loading on tightening of the clamping nuts 38 on clamping bolts 34. Such tightening moves the generally planar annular sealing surface 55 of cover 50 toward generally planar annular sealing surface 14 of nozzle ring body 12. The chevrons 80 and 82 are deformed toward each other. Such clamping load may also deform the resilient elastomeric molded body of the seal 70.

In accordance with the present disclosure, excessive compression loading of gasket 70 is obviated by the presence, within the monolithic molded gasket 70, of rigid inserts 90. Best seen in FIGS. 6 to 9, inserts 90 are arcuate in shape with a longitudinally spaced vertical top surface 92 and bottom surface 94. Each has a radial thickness of about one-eighth inch (⅛"). The arcuate length of each insert between transverse ends is thirty degrees (30°). The inserts are molded into bail 78 at thirty degree (30°) intervals. They are radially outward of chevrons 80 and 82.

Notably, the longitudinal thickness of inserts 90 and bail 76 are about the same, namely, about 0.100 inch. The vertically upward and downward chevrons 80 and 82, however, place the outward tips of the chevrons into contact with the generally annular planar sealing surfaces 14 and 55 of the nozzle ring 12 and cover 50 before compressive forces are applied by clamping bolts 34 and clamping nuts 38.

Referring to FIGS. 6 through 8, inserts 90 are made of rigid material such as stainless steel or carbon fiber composite. They have a generally rectangular cross-section as seen in FIG. 8. The inserts 90 are molded into bail 76 at equally spaced intervals about its annular extent. Inserts 90 may be treated with an appropriate adhesive prior to molding of gasket 70 to insure complete adhesion to the resilient polymeric material forming seal 70. In the embodiment illustrated, six (6) inserts are spaced about the bail 76. On installation of the gasket 70, these inserts are preferably aligned with the six clamping bolt brackets 22 to maximize effectiveness of the absorption of clamping faces imposed upon bail 76 and chevrons 80 and 82 during closure of cover 50 onto manway nozzle ring 12.

Referring to FIGS. 3 and 4, there is a preferred specific relationship between the locations of the inserts 90 molded within bail 76 and the gasket tabs molded onto the exposed edge 75 of short leg 74. These tabs are oriented on an imaginary radial line bisecting the circumferential spacing between two inserts 90. In the embodiment illustrated, with six inserts, that line is located fifteen degrees (15°) between facing ends 95 of adjacent inserts 90. On installation of a gasket 70 upon the nozzle ring 12, one tab is positioned between the spaced arms 18 of cover bracket 16. This orientation radially aligns inserts 90 with the six clamping eye bolts 34. It is understood that if the tank car manway includes eight, rather than six securement bolts, the radial alignment of inserts 90 with the bolt locations is imperfect. It is contemplated, however, that sufficient radial relationship can be attained to accomplish the purposes of compression limitation and prevention of excessive compression and deformation of the resilient gasket monolithic ring member 72. It is, of course, apparent that a gasket 70 in accordance with this disclosure could be provided with eight (8) equally spaced inserts 90 of an arcuate length of 22.5° (degrees) with adjacent ends arcuately spaced apart 22.5° (degrees).

It should also be understood that the embodiments disclosed herein are merely exemplary of possible relationships between the number and orientation of inserts 90 within bail 76 and the number and orientation of the bolt brackets 22. The number of inserts may vary, as well as their circumferential spacing and their positional relationship to the number or location of the brackets 22 without departing from the principles of this disclosure.

The vertical or longitudinal thickness of inserts 90 define and limit, longitudinal movement of the generally planar annular sealing surface 55 of cover 50 toward generally planar annular sealing surface 14 of manway nozzle 12. That is, on closure, the annular sealing surface 55 is advanced toward annular planar sealing surface 14 until these surfaces contact the vertical top surface 92 and vertical bottom surface 94 of the inserts 90. Additional compressive loading by further tightening of clamping nuts 38 onto clamping bolts 34 serves only to deform or distort the components of cover 50. No appreciable additional load is experienced by chevrons 80 or 82 of gasket 70.

Though not visible in FIG. 9, deformation of the resilient gasket 70 by compression between surfaces 55 and 12 causes significant deformation of the gasket 70, including chevrons 80 and 82. The chevrons are thus forced into sealing relation with the sealing surfaces of the associated cover and nozzle ring.

The compressive loading imparts restoring forces within the resilient body of gasket 70. Contact of the annular sealing surfaces 55 and 14 with top surface 92 and bottom surface 94 of inserts 90 prevents further deformation of the gasket. Any additional compressive loading is imparted to the inserts 90.

Preferred embodiments of this invention are described herein, including the best mode known to the inventors for carrying out the invention. Variations of those preferred embodiments may become apparent to those of ordinary skill in the art upon reading the foregoing description. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A gasket for sealing between the open end of a manway nozzle body of a containment vessel and an associated cover comprising:
   a resilient annular ring member having radially inner and radially outer depending legs with an annular bail extending between said legs and including a plurality of rigid arcuate inserts spaced about said bail; and
   wherein said radially outer leg includes at least one tab depending from a distal end positioned in a predetermined relation to said inserts.

2. A gasket as claimed in claim 1, wherein said inserts are made from a material selected from the group comprising steel and carbon fiber composite.

3. A gasket as claimed in claim 2, wherein said inserts are bonded within said bail.

4. A gasket as claimed in claim 3, wherein said resilient annular ring member includes an adhesive between said bail and said inserts.

5. A gasket as claimed in claim 2, wherein said resilient annular ring member is monolithic and made from a material selected from the group comprising a butyl rubber and white nitrite rubber.

6. A gasket as claimed in claim 2, wherein said inserts have an arcuate length of about 30° (degrees).

7. A gasket as claimed in claim 1, wherein said gasket inserts are equally spaced.

8. A gasket as claimed in claim 7, wherein said inserts are disposed on an imaginary line bisecting the arcuate spacing between adjacent inserts.

9. A gasket as claimed in claim 1, wherein said ring member includes at least one annular upstanding chevron extending about an upper surface of said bail.

10. A gasket as claimed in claim 9, wherein said at least one chevron is disposed radially inward of said inserts adjacent said radially inner leg.

11. A gasket as claimed in claim 10, wherein said ring member includes at least one annular depending chevron extending about a lower surface of said bail radially inward of said inserts adjacent said inner leg.

12. A gasket as claimed in claim 11, wherein said inserts have a thickness between a top surface and a bottom surface about the same as the thickness of said bail between said upper surface and said lower surface.

13. A railroad car having a tubular manway body defining an access opening, said body having an upper generally planar annular gasket contact surface, a cover pivotally mounted to said manway body to close said opening, defining a lower generally planar annular gasket contact surface, wherein said manway body includes a plurality of securement brackets disposed about said opening;

an eye bolt pivotally supported on each said securement bracket, each said eye bolt including a threaded end and a threaded nut thereon;

said cover including a clamping plate having a plurality of slots aligned with said securement brackets sized to receive said eye bolts with said nuts positioned about said clamping plate;

a resilient annular ring member having a bail including a plurality of rigid arcuate inserts spaced about said bail;

wherein said gasket is compressed between said upper generally planar annular gasket contact surface of said manway body and said lower generally planar annular gasket contact surface of said cover by said eye bolts and nuts of said securement brackets, wherein said inserts are circumferentially spaced about said bail and disposed in radial alignment with said securement brackets, and wherein said bail includes a radially inner annular depending leg and a radially outer annular depending leg having at least one tab extending from a distal end thereof, and said tab is disposed in a predetermined position relative to said inserts.

14. A railroad car as claimed in claim 13, wherein said bail includes at least one annular upstanding chevron extending about an upper surface of said bail.

15. A railroad car as claimed in claim 14, wherein said bail includes at least one annular depending chevron extending about a lower surface of said bail.

16. A railroad car as claimed in claim 15, wherein said chevrons are disposed radially inward of said inserts adjacent said radially inner leg.

17. A railroad car as claimed in claim 16, wherein said inserts have a thickness between a top surface and a bottom surface about the same as the thickness of said bail between said upper surface and said lower surface.

* * * * *